Figure 3:
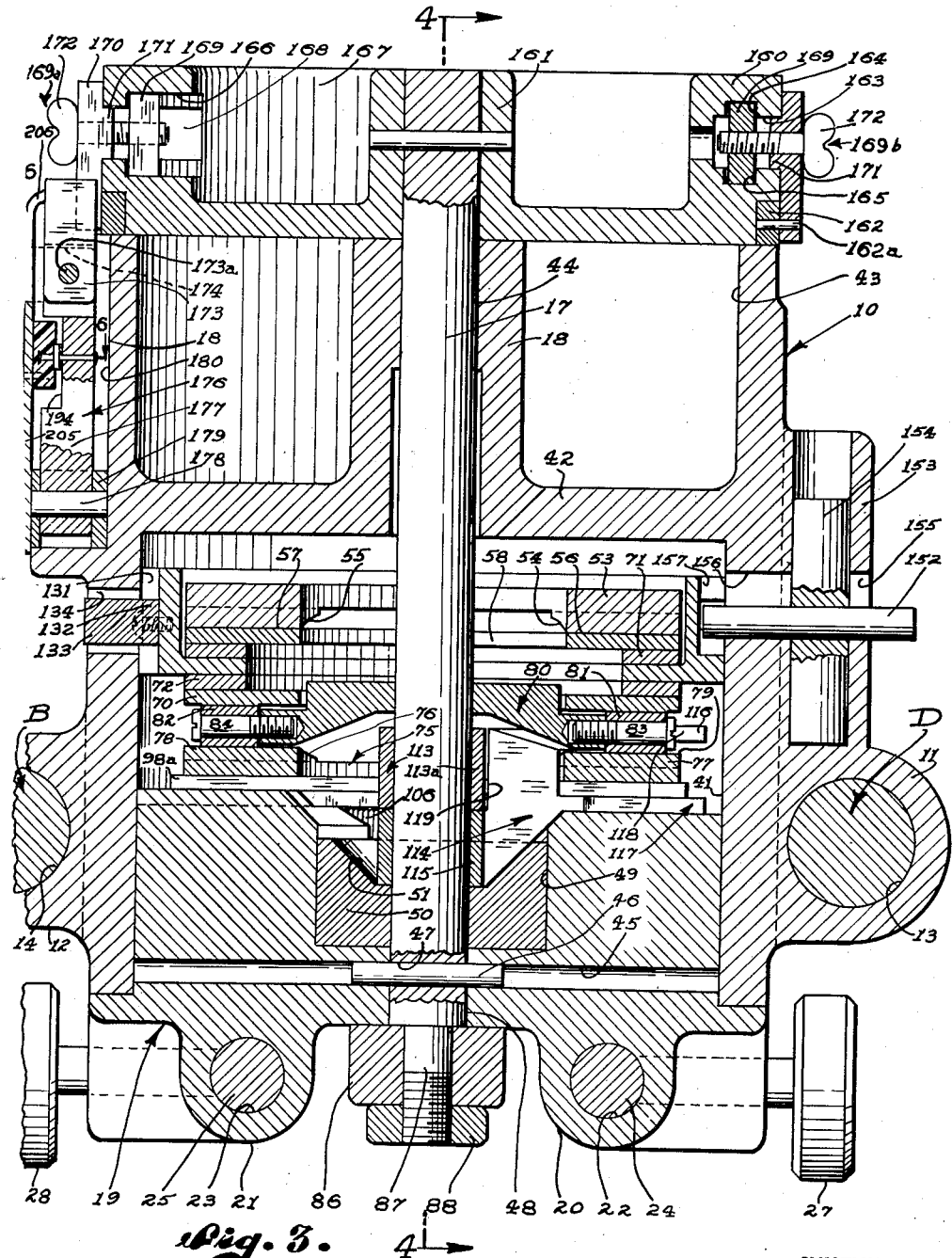

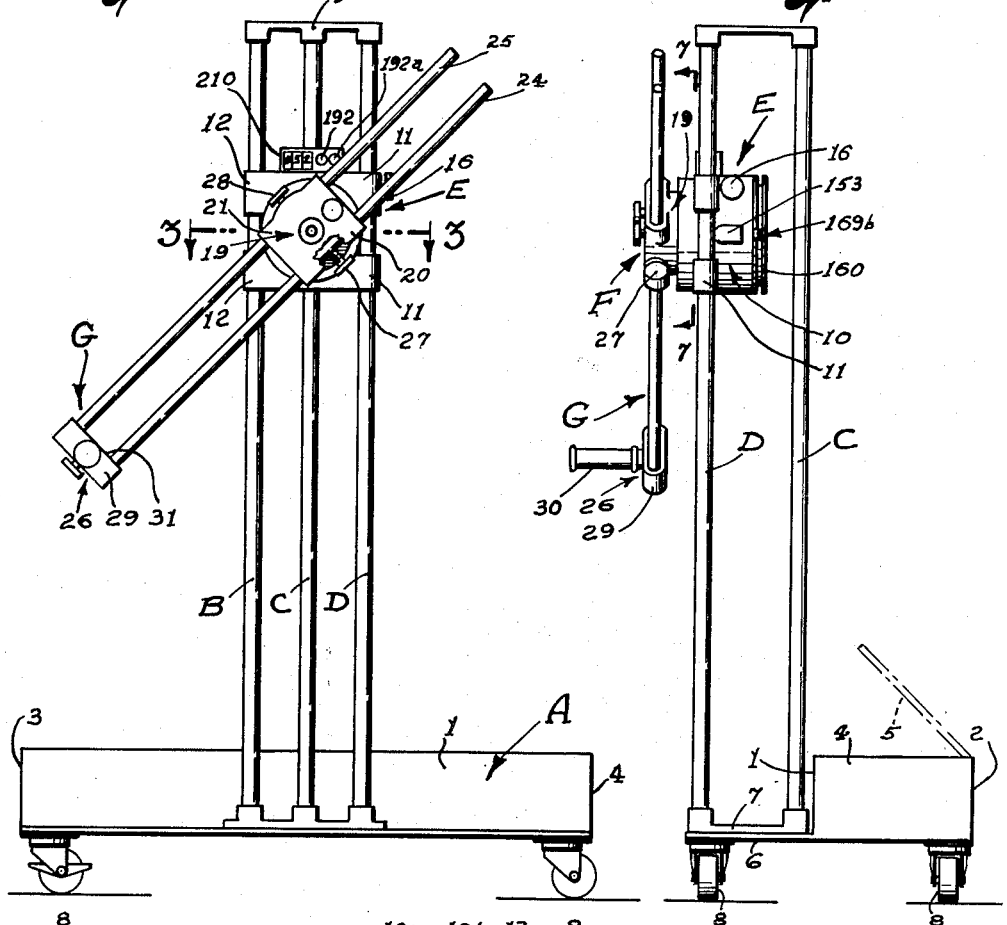
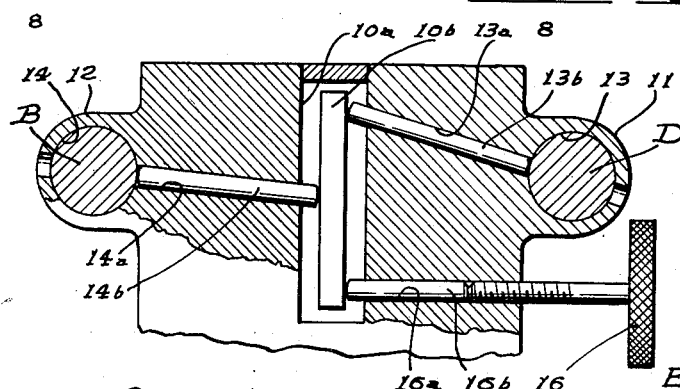

INVENTOR.
EUGENE F. TUTTLE
BY Sellers and Latta
ATTORNEYS

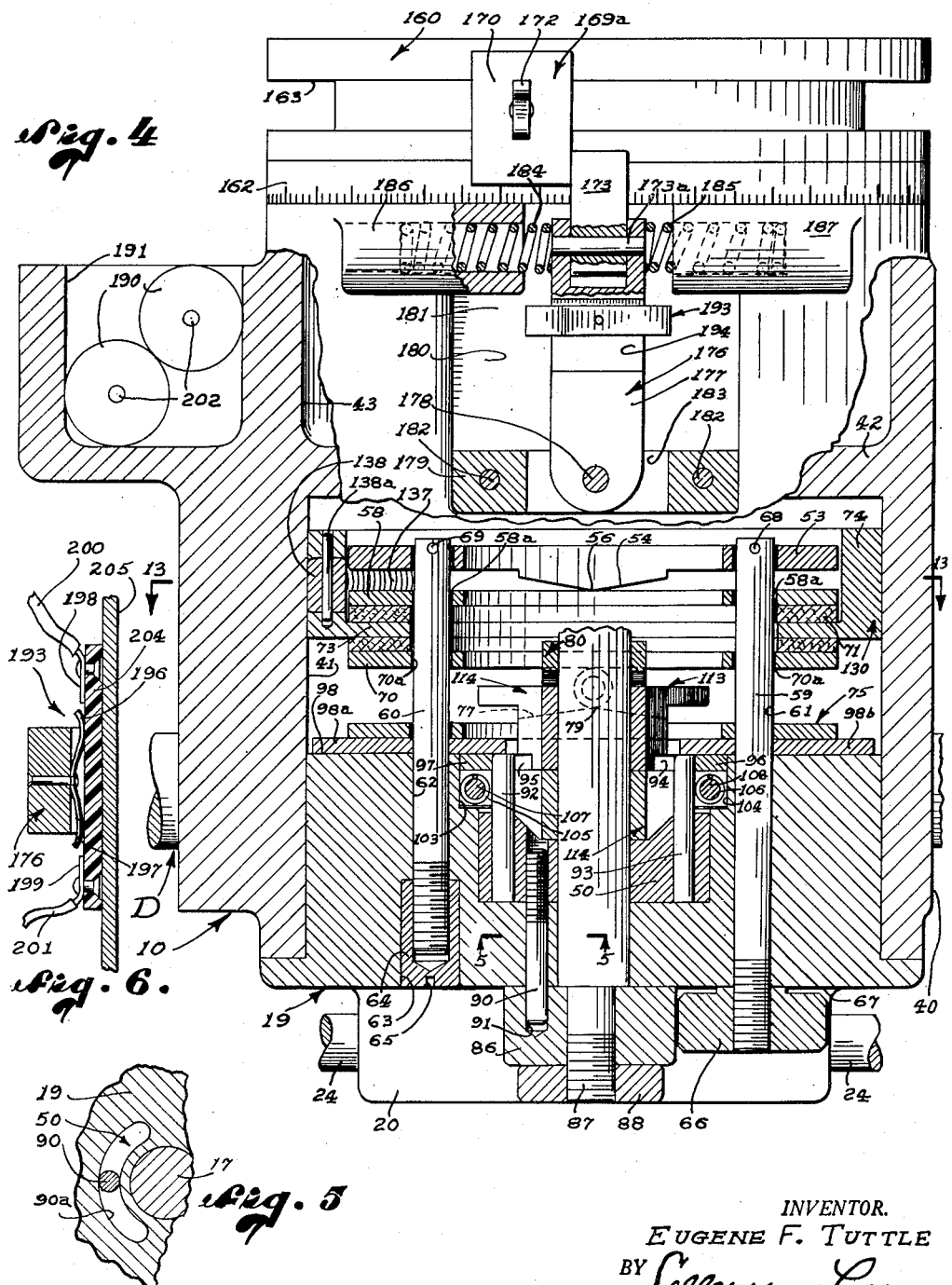

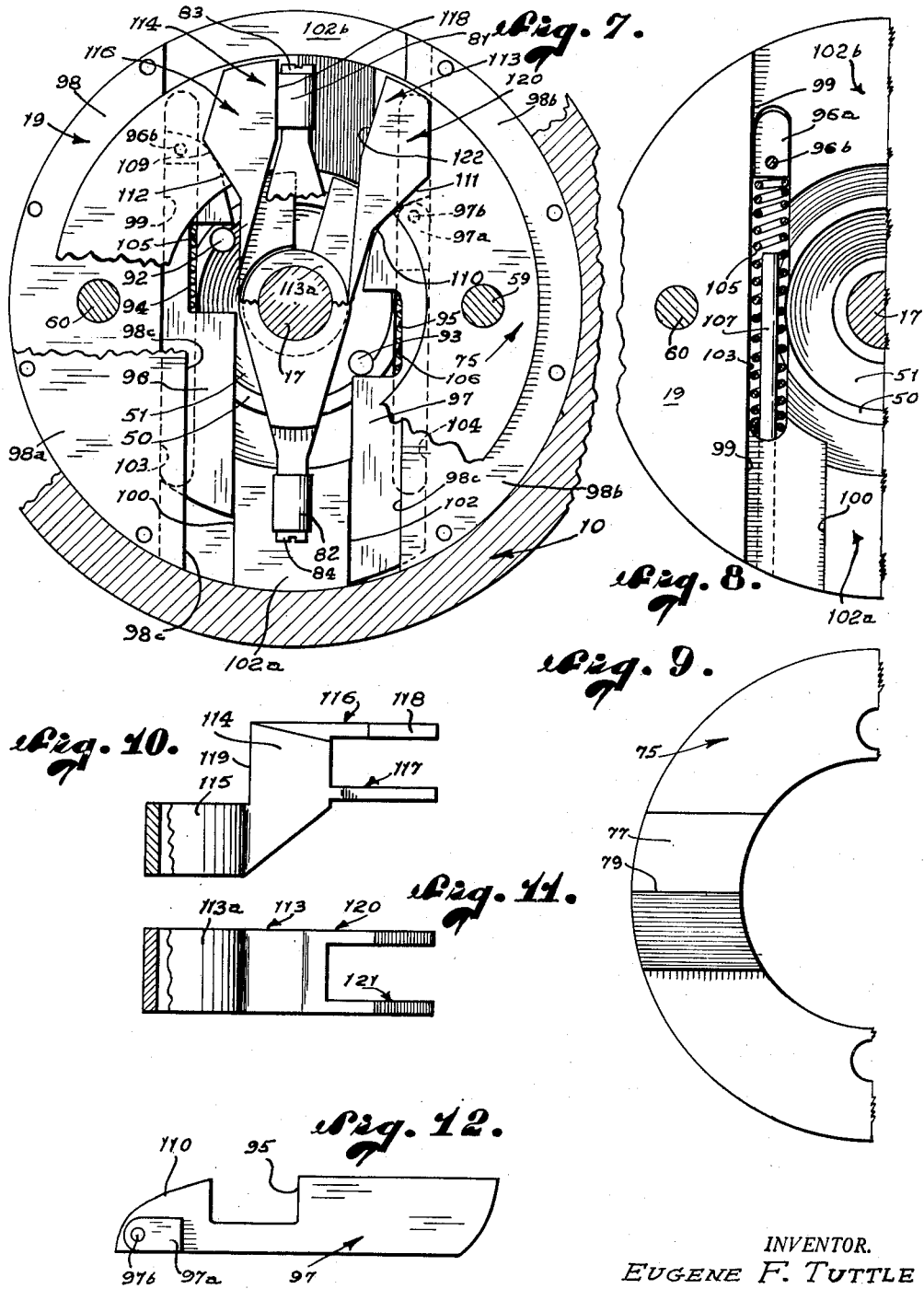

INVENTOR.
EUGENE F. TUTTLE

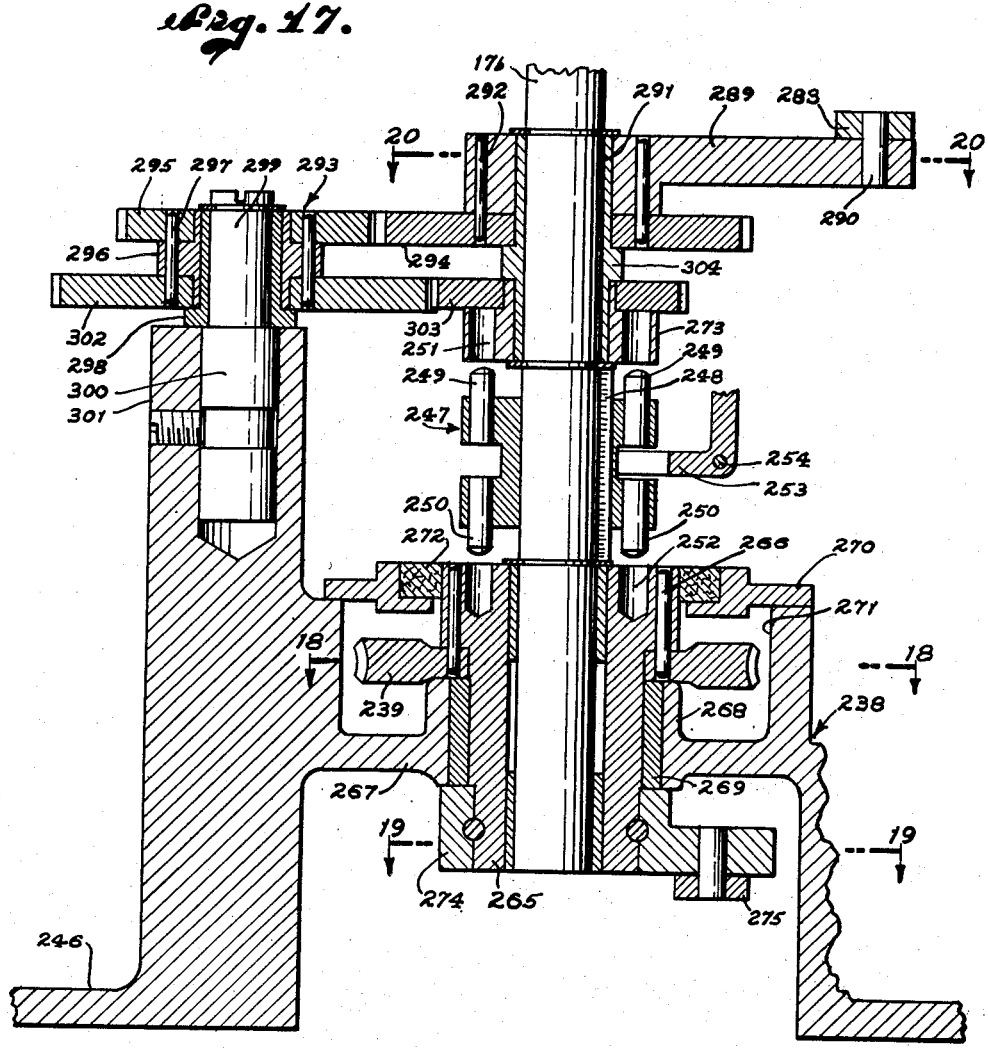

Jan. 15, 1957  E. F. TUTTLE  2,777,439
MANIPULATOR
Filed Oct. 11, 1954  8 Sheets-Sheet 7
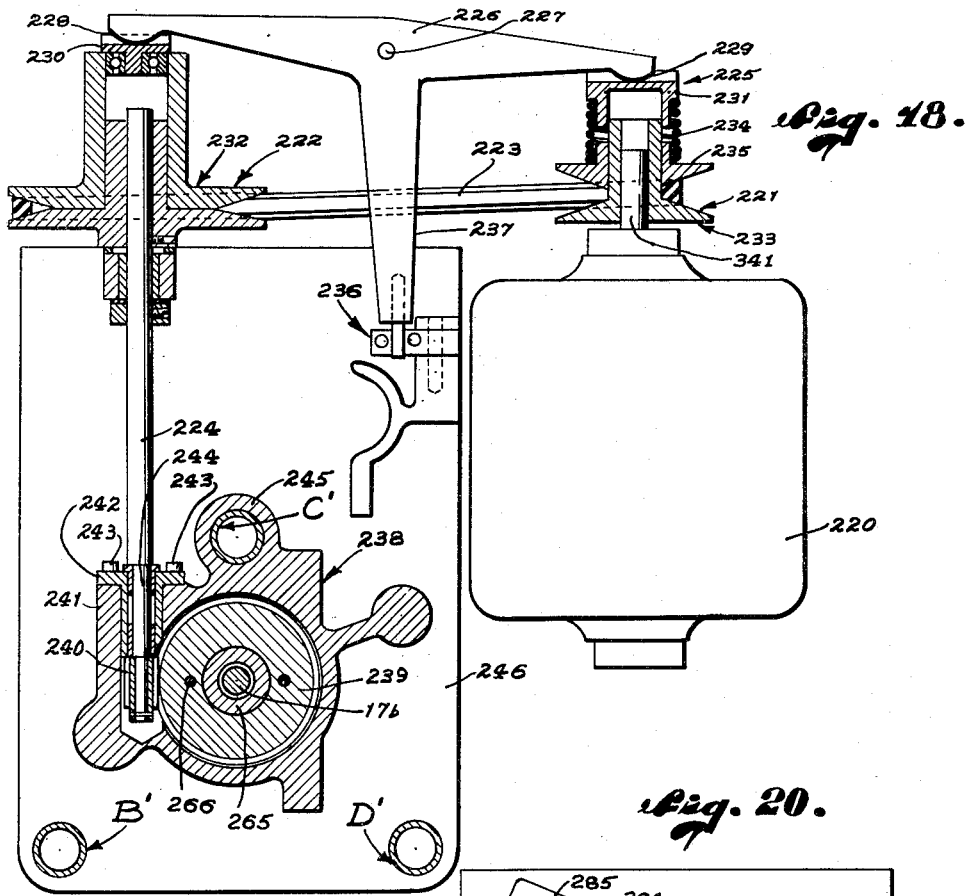
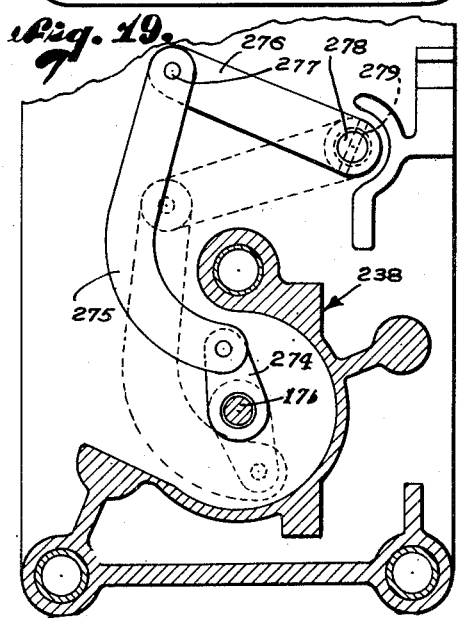
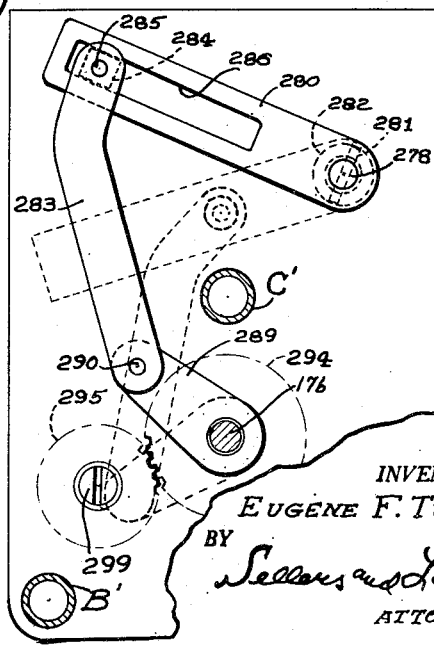
INVENTOR.
EUGENE F. TUTTLE
BY
Sellers and Latta
ATTORNEYS Jan. 15, 1957  E. F. TUTTLE  2,777,439
MANIPULATOR
Filed Oct. 11, 1954  8 Sheets-Sheet 8
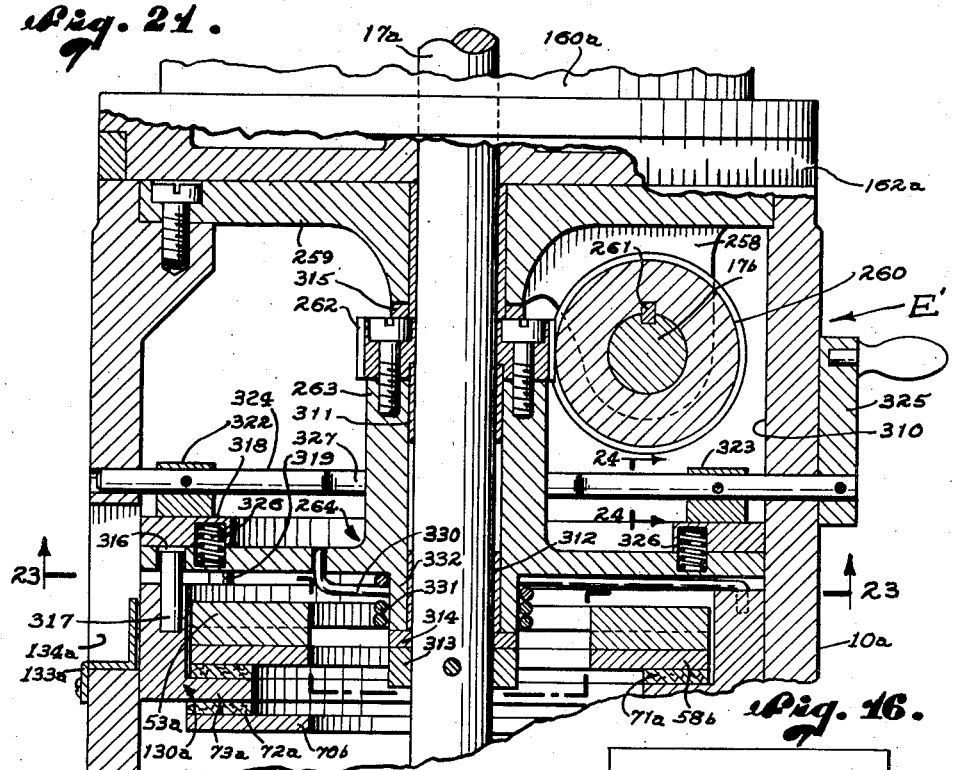
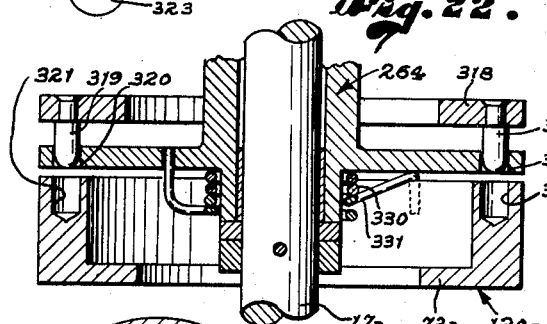
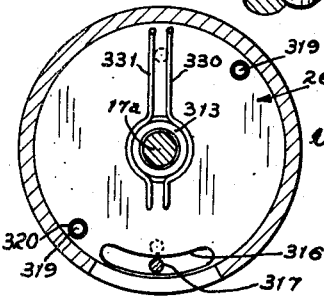
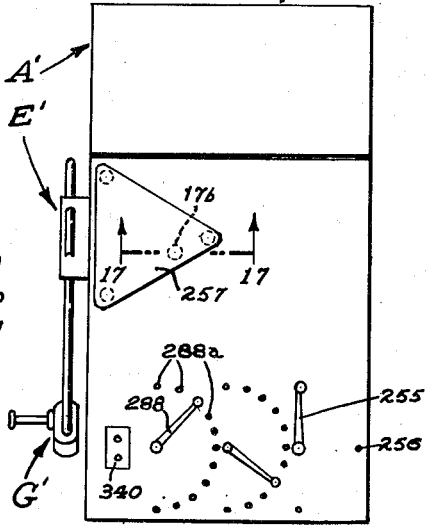
INVENTOR.
EUGENE F. TUTTLE
BY Sellers and Latta
ATTORNEYS United States Patent Office 2,777,439
Patented Jan. 15, 1957

2,777,439
MANIPULATOR
Eugene F. Tuttle, North Hollywood, Calif.
Application October 11, 1954, Serial No. 461,568
15 Claims. (Cl. 128—25)

The invention relates to a manipulator, the same being particularly useful in treating patients inflicted with the type of diseases, wherein appropriate exercising of various muscles or joints of the body will improve the condition and in some cases completely rehabilitate the afflicted people.

It is an object of the invention to provide a manipulator which is fully portable and which can be transferred from one location to another and then put to use without the need of any "setting up" of the machine preparatory to putting it to use.

Another object of the invention is to provide a manipulator having interchangeability features which permit same to function as either an "active" or "passive" manipulating device, the "passive" manipulation being one in which a power unit is utilized to activate the manipulating device and the "active" manipulation being one in which the patient manually activates the manipulating device.

Another object of the invention is to provide a manipulator having interchangeable accessories permitting same to be utilized for exercising foot, ankle, knee, leg, and hip muscles as well as wrist, elbow, arm, neck, shoulder, chest and back muscles and joints.

Another object of the invention is to provide a manipulating device which is fully adjustable so as to accommodate a patient that is either standing, sitting or lying, the device being adjustable to accommodate people with varying arm lengths, etc.

Another object of the invention is to provide a manipulating device in which a pre-determined torque may be imposed on both the forward and return stroke thereof with adjustment means for either increasing or decreasing the torque on either the forward or return stroke.

Another object of the invention is to provide a manipulating device with a counting mechanism employed therewith.

Another object of the invention is to provide a means for cushioning the forward and return strokes of a manipulating device at the end of said strokes.

Another object of the invention is to provide in a "passive" type of manipulating device means for imparting either rotary movement to the manipulable arm or oscillatory movement to the same arm.

Another object of the invention is to provide a variable speed "passive" manipulating device.

Another object of the invention is to provide means for varying the length of the arcuate stroke when the "passive" manipulating device is set for oscillatory movement.

Another object of the invention is to provide means for indicating the operation of a manipulating device when same is in use.

Figure 13:
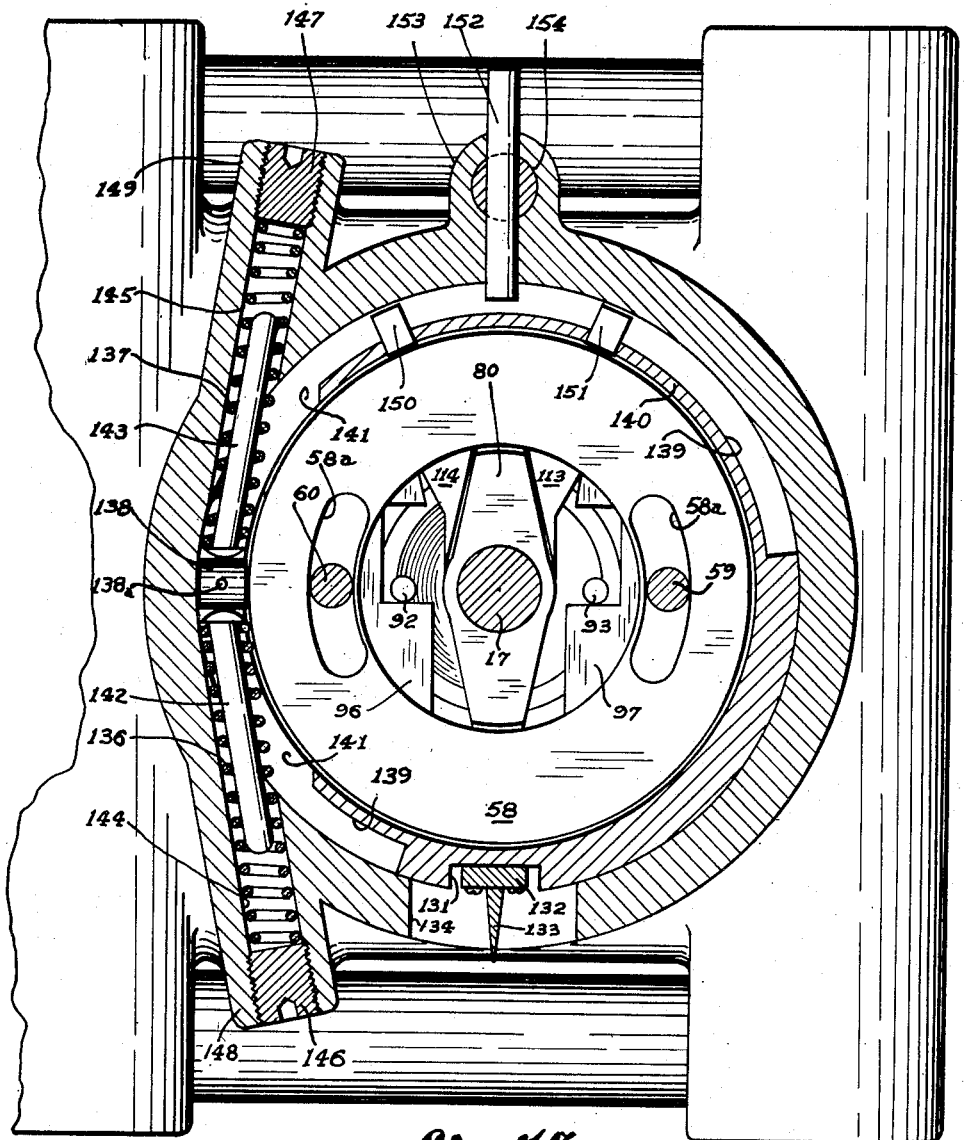
Figure 15:
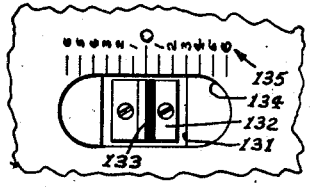

Other objects and advantages of the invention will be apparent from the ensuing specification and appended drawings in which:

Fig. 1 is a front elevational view of the "active" manipulating device;
Fig. 2 is a side elevational view of the device of Fig. 1;
Fig. 3 is a sectional view taken on the line 3—3 of Fig. 1 except that the manipulatory arm and the head to which it is attached will be considered as rotated to a true vertical position instead of the angular position as shown in Fig. 1;
Fig. 4 is a partial sectional view taken on the line 4—4 of Fig. 3;
Fig. 5 is a fragmentary sectional detail view taken on the line 5—5 of Fig. 4;
Fig. 6 is a fragmentary sectional detail view taken on the line 6—6 of Fig. 3, but rotated 180 degrees;
Fig. 7 is a sectional view taken on the line 7—7 of Fig. 2 with the manipulatory arm considered in a vertical position as in Figs. 3 and 4;
Fig. 8 is a fragmentary detail plan view of the rotary casting with certain parts positioned therein;
Fig. 9 is a detail fragmentary plan view of the cam ring;
Fig. 10 is a detail view of the lower control lever, partly in section;
Fig. 11 is a detail view of the upper control lever, partly in section;
Fig. 12 is an underneath detail plan view of one of the actuator bars;
Fig. 13 is a sectional view taken on the line 13—13 of Fig. 4;
Fig. 14 is a fragmentary detail view, partly in section, of the mechanism for clamping the head assembly relative to its supporting columns at any pre-selected height.
Fig. 15 is a fragmentary detail view of the torque recording scale;
Fig. 16 is a plan view of a modified form of the invention comprising a combined active and passive manipulating device;
Fig. 17 is a fragmentary sectional view taken on the line 17—17 of Fig. 16 but including only mechanism which is enclosed within the cabinet portion of the machine;
Fig. 18 is a sectional plan view of the power actuating mechanism enclosed within the cabinet portion of the machine and taken at the level of the line 18—18 of Fig. 17;
Fig. 19 is a sectional plan view taken on the line 19—19 of Fig. 17;
Fig. 20 is a sectional plan view taken on the line 20—20 of Fig. 17;
Fig. 21 is a fragmentary sectional detail view of the head assembly employed with the manipulating device of Fig. 16;
Fig. 22 is a fragmentary sectional detail view similar to Fig. 21 but rotated 90 degrees and having certain parts removed;
Fig. 23 is a sectional view taken on the line 23—23 of Fig. 21 with various parts located exteriorly of the housing being removed and rotated 90 degrees; and
Fig. 24 is a sectional detail view taken on the line 24—24 of Fig. 21.

THE ACTIVE MANIPULATOR OF FIGS. 1–15

1. General description

Referring to Figs. 1 and 2 the active manipulating device generally consists of a storage box and platform assembly A having the spaced uprights B, C and D, the front two of which carry the stationary portion of the head assembly E, the head assembly being adjustable relative to the uprights B and D to any height. The front portion F of the head assembly is rotatably supported relative to the rear stationary portion and the manipulatory arm assembly G is adjustably carried thereby.

The platform and storage box assembly includes the storage compartment having the side walls 1 and 2 and the end walls 3 and 4 with a lid 5 hingedly connected to the side wall 2. The floor of the storage compartment has an outwardly extending platform portion 6 to the upper surface of which the column supporting casting 7 is secured. Casters 8 may be secured to the underside of the platform 6 at the four corners thereof to render the entire manipulating device completely portable and ready for use in any location to which the device may be wheeled. One or more of the casters may be of the locking type. The lower ends of the columns B, C and D are securely received within suitable sockets in the casting 7 and the upper ends of said columns are received in similar sockets formed in the casting 9 which may be of identical construction to the casting 7, the upper casting serving to maintain the column in the desired spaced and parallel relationship to permit the head assembly to be adjustably carried by the said columns B and D. The stationary portion E of the head assembly includes a casting 10 having the bosses 11 and 12 formed on opposite sides thereof, said bosses having the bores 13 and 14 (see Fig. 3) therethrough, the bores being in parallel alignment with each other. The columns B and D extend through the bores 14 and 13 respectively so that the casting 10 is telescopically positioned on columns B and D permitting the head assembly to be adjusted throughout the entire height of said columns and temporarily anchored by tightening the adjustment screw 16 at any pre-selected height. Referring to Fig. 4 I have shown the details of the mechanism for tightening the head assembly at a pre-selected adjustment height relative to the columns B and D. An elongated slot 10a is cut in the casting 10 into which the bar 10b is loosely mounted. The casting 10 is drilled to provide the necessary bores 13a and 14a into which the pins 13b and 14b are loosely received. A bore 16a loosely receives the pin 16b and the shank of the thumb screw 16 is threaded into the outer end of the bore 16a. Thumb screw 16 is loosened to permit the head assembly to be manually moved up or down relative to the columns B and D until the desired adjustment height is reached, then upon tightening the adjustment screw 16 the inner end thereof forces the pin 16b against the end of the bar 10b thereby rocking the bar slightly whereby to simultaneously cause the pins 13b and 14b to be pushed outwardly against the respective columns D and B so that the head assembly is anchored relative to each of the columns B and D under equal tension by means of a single thumb screw 16.

The rotatable portion F of the head assembly is mounted on a central shaft 17 (see Fig. 3) which is rotatably journalled in the hub portion 18 of the stationary casting 10. The rotatable member includes the casting 19 which has the bosses 20 and 21 at opposite sides thereof. Each boss has an internal bore therethrough, 22 and 23, the bores being in parallel alignment with each other and telescopically receiving the cylindrical rods 24 and 25 which in conjunction with the hand or foot gripping accessory indicated generally by the numeral 26 forms the manipulatory arm of the manipulating device. A pair of thumb screws 27 and 28 are threaded through the side walls of the bosses 20 and 21 and are engageable with the rods 24 and 25 for anchoring same in a preselected position of adjustment relative to the casting 19. In the hand gripping type of accessory which is connected to the ends of the rods 24 and 25 a casting 29 may be provided with sockets to receive the ends of the rods and a hand grip 30 extends outwardly from the casting 29. The distance between the hand grip 30 and the axis of shaft 17 determines the radius of the arc which is described by the arm assembly as it is swung about the axis of shaft 17 and the adjustment screws 27 and 28 permit adjusting this radius to any desired length within the limits defined by the outer end of the rods 24 and 25 and the inner face 31 in its engagement with the end face 32 of casting 19.

The head assembly has mechanism incorporated therein for performing various functions set forth individually hereinafter as follows:

2. *Torque calibration*

The arm assembly G may be swung throughout an arc of predetermined length and then returned to the starting position and under some conditions it may be desirable to provide a predetermined resistance on the forward stroke and no resistance on the return stroke, or no resistance on the forward stroke and a predetermined resistance on the return stroke or a predetermined like amount of resistance on both the forward and return stroke, or a predetermined amount of resistance on the forward stroke and a predetermined lesser or greater resistance on the return stroke, and adjustable mechanism is provided within the head assembly for presetting the device to meet any one of the foregoing conditions. Referring to Figs. 3 through 12, the stationary casting 10 has a generally cylindrical external wall 40 (with bosses projecting outwardly therefrom where appropriately needed as will be explained hereinafter) with an annular internal chamber 41 formed at one end thereof and an integral web portion 42 forming the base of the chamber and separating the first chamber from the second annular chamber 43 which is formed at the opposite end of the casting. A central hub 18 is formed integrally with the web 42 and has an axial bore 44 therethrough for rotatably supporting the shaft 17. The casting 19 has a diametrical bore 45 therethrough permitting insertion of the pin 46 which may be pressed through the diametrical bore 47 in shaft 17 with a snug fit so that shaft 17 is rotatable with casting 19. The casting 19 has the axial bore 48 through which shaft 17 passes and an enlarged counterbore 49 which receives the axially bored cylindrical block 50 which is loose on the shaft 17. The block has a frusto-conical internal wall 51 for reasons to be pointed out hereinafter. The rotatable casting 19 has a braking mechanism associated therewith for supplying the predetermined resistance under one of the various conditions as set forth hereinbefore. An annular ring 53 encircles the shaft 17 and has diametrically opposed fulcrum lugs 54 and 55 each of the end walls of which are tapered and converge toward the apexes 56 and 57 which bear against the end face of the annular braking ring 58. Diametrically opposed rods 59 and 60 are journalled loosely through appropriate diametrically opposed parallel bores 61 and 62 in the casting 19, the bore 62 communicating with the counterbore 63 which loosely receives the internally threaded bushing 64, which is threaded onto the end of rod 60, a screw slot 65 permitting tightening or loosening of the bushing 64. An internally threaded cap nut 66 is threaded onto the end of rod 59, the end of the nut being engageable with the end face 67 of casting 19. The inner ends of the rods 59 and 60 are pinned to the pressure ring 53 by means of the fulcrum pins 68 and 69 which are received in appropriate grooves in the face of ring 53 and which permit a slight rocking movement of said rods about the axes of said pins relative to the pressure plate 53. The brake rings 58 and 70 have annular facings 71 and 72 adhered thereto and formed of a suitable friction material for coacting with the opposite faces of the annular flange 73 of the stationary member 74 (the annular member 74 is capable of limited rotative movement as will be explained hereinafter). The braking rings 58 and 70 have appropriate arcuate openings 58a and 70a (see Fig. 13) therein through which the rods 59 and 60 pass and consequently said rings are rotatable along with the casting 19 subject to the lost motion condition afforded by the lengths of the arcuate openings. This will be explained hereinafter.

In the openings in pressure plate 53 through which the rods 59 and 60 pass, there is sufficient clearance to allow the slight rocking movement imparted to the plate as a result of same being engaged with ring 58 through the medium of the fulcrum edges 56 and 57.

A second annular pressure plate 75 is axially spaced from pressure plate 53 and is annular in form, encircling shaft 17 and this pressure plate has outwardly projecting lugs 76 and 77 formed on one face thereof, the end walls of which are tapered and converge toward the apexes 78 and 79 respectively, the tapered end faces serving as cam surfaces for reasons to be pointed out hereinafter. A roller carrying member 80 has a central web portion with an axial bore through which shaft 17 passes, the roller carrying member being loose on the shaft 17 but maintained coaxially relative to the pressure plate 75 and the brake rings 58 and 70 by means of the shaft 17. The "active" rollers 81 and the "follower" 82 are rotatably supported on the shanks of bolts 83 and 84 which are threaded into the opposite ends of the roller carrying member 80. The roller carrying member functions as a brake releasing device whenever the rollers are permitted to ride down the cam surfaces on either side of the apexes 78 and 79 of the lugs 76 and 77 by permitting axial movement of the lower brake ring 70 sufficiently to release the frictional engagement of the facing 72 with the under side of the annular flange 73. The extent to which the rollers are permitted to ride down the cam surfaces on one side of the apexes, determines the extent to which the resistance is lessened on either the forward or the return stroke on arm assembly G and the adjustment of the roller carrying member in its operation with reference to the lugs 76 and 77 is effected by means of the adjustable cap nut 86 which is loosely mounted on the reduced end portion 87 of shaft 17, the lock nut 88 being threaded onto the end of the shaft extension 87 to lock the adjustment nut 86 in a pre-selected position of rotative adjustment about the axis of shaft 17. A pin 90 is threaded at one end into the actuator block 50, said pin extending through the casting 19 and into a bore 91 in cap nut 86, the bore of course being eccentric relative to the axis of shaft 17. The casting 19 is provided with an arcuate slot 90a (see Fig. 5) permitting the pin 90 to move within the limits of said slot so that when cap nut 86 is rotated about the axis of shaft 17, such rotative movement will be imparted to the actuator block 50 but not to the casting 19. The actuator block has parallel diametrically opposed bores therethrough into which the pins 92 and 93 are received, the upper ends of said pins projecting into the notches 94 and 95 (see Fig. 7) which are cut in the side walls of the actuator bars 96 and 97. The end face 98 of casting 19 has the parallel slots on opposite sides of shaft 17 therein providing the side walls 99 and 100 which guide the rectilinear movement of bar 96 and the side walls 101 and 102 which guide the rectilinear movement of bar 97. The provision of these slots results in an elevated portion 102a in casting 19 on one side of shaft 17, however, on the diametrically opposite side of the shaft the entire surface area 102b between the side walls 99 and 101 is flat to accommodate the lower branches 117 and 121 of the control levers 113 and 114 and to permit limited rotative movement of such levers within the limits offered between the side walls 99 and 101.

Additional narrower slots 103 and 104 open into the actuator bar accommodating slots but extend downwardly into the casting 19 below the level of the bar accommodating slots and a pair of compression springs 105 and 106 are received within these narrow slots, being guided thereby and being prevented from buckling by means of the internal guide pins 107 and 108, these pins being anchored to the casting 19. A pair of guide blocks 96a and 97a are anchored by means of pins 96b and 97b at the forward ends of actuator bars 96 and 97 respectively on the underneath sides thereof, these guide blocks being received within the narrow slots 103 and 104 and serving to guide the forward ends of the actuator bars against any deviation from rectilinear movement (the rearward ends of said bars being guided in the slots between the side walls 99—100 and 101—102 as previously explained hereinbefore). The forward ends of the springs engage the guide blocks 96a and 97a respectively and normally urge the guide bars in a direction toward the anchoring pins 96b and 97b. A pair of plates 98a and 98b in segmental form are fixed to the end surface of casting 19 on opposite sides of shaft 17 and the inside margins 98c of said plates overhang the actuator bars to confine same within their guide slots (see Fig. 7—only a portion of plate 98a is shown). The actuator bars have rounded ends 109 and 110 which engage the inclined side faces 111 and 112 of the lower branches 117 and 121 of the roller controlling levers which are designated generally by the numerals 113 and 114. The lower control lever 114 (a detail view of which is shown in Fig. 10) has the central hub portion 115 and a radially outwardly extending leg portion integral with the hub portion, the leg being bifurcated at its outer end providing the upper and lower branches 116 and 117, the upper branch having an inclined side wall 118 (see Fig. 7) which coacts with the roller 81 and the lower branch having the inclined side wall 112 which coacts with the rounded nose portion of the actuator bar 96. The upper control lever 113 has a hub portion 113a which rests on the hub portion 115 of the lower control lever and its external wall is spaced adjacent to the end wall 119 which is formed on the lower control lever. The upper control lever (a detail view of which is shown in Fig. 11) also has a radially outwardly extending leg integral with the hub 113a, the outer end of said leg being bifurcated to provide the upper and lower branches 120 and 121, the upper branch having the side wall 122 which coacts with the roller 81 and the lower branch having the inclined side wall 111 which coacts with the rounded nose portion of actuator bar 97. By bifurcating the outer ends of both the upper and lower control levers, the bifurcations lying in a common circumferential path, the cam ring 75 is accommodated within such bifurcations of the control levers which may be rotated within a limited range about the axis of shaft 17 (the hubs 115 and 113a being loose on said shaft) within the necessary limits of rotative movement needed for adjustment purposes.

In order to make the initial adjustment of the braking mechanism so as to set up a pre-determined resistance to the swinging of the arm assembly G about the axis of shaft 17, the lock nut 88 is loosened and nut 86 is rotated about the shaft extension 87 causing the actuator block 50 and the attached pins 92 and 93 to swing about the axis of shaft 17 toward a neutral position in which the notches 94 and 95 would be diametrically opposed to each other and the pins 92 and 93 would lie in the approximate positions as shown in Fig. 13. When the pins 92 and 93 are in the neutral position of Fig. 13, the springs 105 and 106 will maintain the actuator bars in their fully extended upward position. With the actuator bars in neutral position the rollers 81 and 82 will be lying directly above the apexes 78 and 79 of the cam ring 75. Then the sleeve 64 will be tightened to such an extent that the upper end of rod 60 will lie in a plane substantially common to the plane of the upper end of rod 59. The adjustment of sleeve 64 will be "made at the factory" and thereafter, any subsequent adjustment by the user of the machine will be made by adjusting the cap nut 66 only. By providing the pressure ring 53 with "knife-edge" contact only on diametrically opposite sides of the braking plate 58 (by means of the lug fulcruming apexes 56 and 57 as previously explained) I am able to provide uniformity of pressure in a direction axially of shaft 17 against the braking member 58 throughout its entire circumferential extent. Thus the final adjusting of axial pressure on brake plate 58 can be effected on one side of shaft 17 (through the medium of rod 59) by tightening or loosening only the one adjustment nut 66.

The torque resistance imposed on the arm assembly G can be read at this point by means of an indicating device to be explained hereinafter, such torque resistance being the same on the forward stroke as it will be on the return stroke due to the neutral position of the rollers 81 and 82 relative to the cams 76 and 77. Then if it is desired, for example, to decrease the amount of resistance on either the forward or the return stroke, it is only necessary to loosen the lock nut 88 and rotate nut 86 so that one of the actuator bars is moved downwardly (viewing Fig. 7). The other bar remains in the neutral or fully extended upward position due to the action of the compression spring 105 or 106. Thus, for example, if nut 86 were rotated to cause pin 93 to force actuator bar 97 to its lowermost position as shown in Fig. 7 then the length of notch 94 is such as to permit pin 92 to swing to the position shown in Fig. 7 while bar 96 remains in the neutral position due to the action of spring 105. This means that when the arm assembly G is swung in one direction, the roller 81 will bump into the end wall 118 of control member 114, this being the position in which the rollers 81 and 82 are resting on the apexes of the cams 76 and 77 wherein maximum pressure is being exerted on the under side of brake plate 70 by the rollers and the maximum frictional resistance to movement of the arm assembly G is encountered due to the amount of frictional engagement which the facings 71 and 72 are imposing against the opposite faces of the stationary annular flange 73. On the reverse stroke of the arm assembly G, the frictional engagement of the rollers 81 and 82 with the underside of brake plate 70 and the apexes of the cams 76 and 77 will immediately cause the rollers to commence travelling down the cam surfaces on the pressure ring 75, thereby immediately releasing the pressure being exerted by the rollers against the under side of brake plate 70 and reducing the frictional resistance of the facings with the flange 73. With the actuator bars 96 and 97 set in positions shown in Fig. 7, the rollers will be permitted to travel down the cam surfaces sufficiently far before roller 81 engages wall 122 of control lever 113 so as to reduce the resistance to zero on the reverse stroke of the arm assembly G, however, it will be understood that either of the actuator bars can be backed off to a pre-determined position by rotation of nut 86 so that the rollers can act on either side of the apexes of the cams 76 and 77, thereby reducing the resistance to the swinging of arm G on either the forward or the reverse stroke thereof as desired and thereby making it possible to accurately calibrate the amount of torque resistance to be encountered on the forward stroke and the amount of torque resistance to be encountered on the return stroke, or if desired the setting can be made so that there is zero torque resistance on either the forward stroke or the return stroke, etc. The arcuate slots 58a and 70a in the brake rings provide a lost motion connection between such rings and the rods 59 and 60 so that when initial rotation of casting 19 (through the swinging of arm assembly G) is effected, the brake rings are permitted to remain stationary momentarily to assure the immediate rolling action of the rollers down the cam surfaces (the roller carrying member 80 being loose on shaft 17). When the lost motion distance is utilized then the brake rings will be positively rotated along with casting 19 about the axis of shaft 17.

The reaction ring 74 is of annular form having the radially inwardly directed annular flange 73 which is integral with the axially extending rim portion 130, the external wall of which is of generally cylindrical form and loosely received within and guided by the internal cylindrical wall 41 of the casting 10. Referring to Figs. 3, 13 and 15 the reaction ring has a transverse slot 131 cut in its periphery to accommodate the base portion 132 of the indicating pointer 133 which projects outwardly through the wall of casting 10 and is free to move within the limits of the elongated aperture 134 which is cut in the casting wall. Indicia indicated generally by the numeral 135 may be inscribed in the casting wall with the zero reading located at the midpoint of the slot 134 and the numerals on either side of zero indicating resistance on the forward and return strokes respectively. The ring 74 is capable of limited rotative movement (for initial adjustment purposes only), such movement being induced by the frictional engagement of the facings 71 and 72 with the annular flange 73, such rotative movement being progressively resisted by appropriate compression springs 136 and 137 acting on opposite sides of the shoe 138 which is secured to the ring 74 as by means of pin 138a (see Fig. 4). Viewing Fig. 13 it will be noted that the ring 74 has a peripheral groove 139 extending throughout a substantial portion of its circumference. A segmental portion of the peripheral web 140 may be cut away at 141 to accommodate the springs 136 and 137 during the limited rotative movement of ring 74. Guide pins 142 and 143 are positioned interiorly of the springs and have head portions which engage the shoe 138, the outer ends of the springs being received within appropriate bores 144 and 145 provided in the casting 10. Adjustment nuts 146 and 147 are threaded into the bosses 148 and 149 on casting 10 for adjusting the tension on the springs. As the arm assembly G is swung in one direction, the frictional engagement of the facings 71 and 72 with the annular flange of ring 74 will result in a predetermined amount of torque being imposed on ring 74, causing limited rotation of said ring against the tension of one of the springs 136 or 137 (depending upon the direction of rotation of arm assembly G). The resistance offered by the appropriate compression spring permits rotation of ring 74 relative to casting 10 thereby moving the indicating pointer 133 a pre-determined distance on one side of the zero mark on scale 135 until such time as the resistance offered by the compression spring is equivalent to the frictional resistance imposed by the facings on the annular flange of ring 74 and further rotation of said ring ceases as slippage occurs between the facings and the annular flange, the torque reading however being reflected on the scale 135. Rotative movement of ring 74 is positively limited within the arc defined between pins 150 and 151, these pins being secured to ring 74 and being engageable on opposite sides of the stop pin 152 for limiting the rotative movement of ring 74 relative to casting 10, to prevent possibility of the heads of pins 142 and 143 from being disengaged from the shoe 138. A boss 153 formed on casting 10 has a bore therein to receive pin 154 and ring 74 may be locked stationary by grasping the outer end of pin 152 which projects through the elongated slot 155 in the casting boss and raising the pin 152 to the upper limits of slots 155 and 156 whereupon the inner end of pin 152 becomes positioned within the notch 157 which is cut in the peripheral flange of ring 74 at neutral position, this notch being of only slightly greater width than the diameter of pin 152.

It will be understood that after the necessary adjustments have been made for obtaining the desired torque conditions on both the forward and return stroke of the arm assembly G, then it is necessary to lock the reaction ring 74 stationary so that slippage between the brake facings and the reaction ring will occur immediately, as desired, on the forward and return stroke of the manipulating arm assembly.

3. *The mechanism for adjusting the length of and for cushioning the stroke of the manipulating arm*

An annular casting 160 has a central hub portion 161 which is pinned to the end of shaft 17 so as to be rotatable therewith. The annular casting 160 has a peripheral groove 163 extending throughout its entire circumference and undercut grooves 164 and 165 extending throughout the entire circumference each of said undercut grooves opening into the major groove 163. Opening 166 is provided in the internal wall 167 to allow nuts 169 to be inserted from the interior of the casting 160, thus providing a continuous 360 degree outer wall of the undercut grooves 164 and 165 for the nuts 169 to clamp against. There are two of these segmental blocks 169 and a second pair of blocks 170 have the tongue portions 171 received within the peripheral groove 163 and thumb screws 172 extend loosely through the bores in the blocks 170 and are threaded into the blocks 169. These two clamp assemblies (made up of the blocks and thumb screws) which may be identified generally with the numerals 169a and 169b can be shifted to any position about the circumference of casting 160 by loosening the thumb screws and then running the entire clamp assembly about the circumference of the casting 160. These clamp assemblies can be brought into contact with each other adjacent the arm 173 and in this position the casting 160 may be rotated throughout an arc of in excess of 300 degrees until one of the clamp assemblies comes into contact with one side of the limiting arm 173 and the other clamp assembly comes into contact with the opposite side of said limiting arm.

The ring 162 preferably has appropriate indicia inscribed about its entire circumference and graduated in degrees from 0 to 360 and a pin 162a secures the ring to clamp assembly 169b so that the ring is rotatable relative to casting 160 along with the clamp assembly, thereby providing a movable "zero" wherein the setting of the clamp assembly 169b relative to casting 160 determines the starting point of the stroke of arm assembly G and the starting point can be set at any point within the full range of circular movement of the arm assembly about the axis of shaft 17.

The arm 173 can be swung down about the axis of pivot pin 173a to the position as shown in dotted lines at 174 in Fig. 3 so as to permit the manipulating arm assembly G to be swung throughout one or more complete 360 degree revolutions if desired. When the arm 173 is in the position as shown in solid lines in Fig. 3 then the clamp assemblies may be set at any desired position on either side of arm 173 and locked in that position by tightening the thumb screws 172, the length of the arc of movement of arm G thus being determined by the predetermined settings of the clamp assemblies. The arm 173 is pivotally mounted on the pin 173a, and serves as the upper end of the overall arm assembly which may be referred to generally by the numeral 176, the complete arm assembly including the upper arm 173 and the lower arm 177 which is mounted on the pivot pin 178, the axis of which is transverse to the axis of the pin 173a. A block 179 is anchored within the recess area 180 of the casting 10 against the end wall 181 of said recess as by means of screws 182 (see Fig. 4). The block 179 has an elongated aperture 183 to accommodate the lower end of the arm 177 so as to permit rocking movement of the complete arm assembly 176 about the axis of pin 178. A pair of compression springs 184 and 185 are received respectively within appropriate bosses 186 and 187 formed in the casting 10, said springs being under compression against the ends of the opposite branches of the bifurcated end of arm 177. Thus when the arm assembly G is swung in one direction until the block 170 engages the arm 173 at that end of the stroke, a cushioning effect is provided in that the arm assembly 176 is mounted between the opposed compression springs and is free to rock slightly about the axis of pin 178 against the resistance of the compression springs. Thus for example, viewing Fig. 4, when the clamp assembly 169a as shown engages one side of the arm 173, the arm assembly 176 is rocked slightly about the axis of pin 178 against the resistance of spring 185 to cushion the end of the stroke. At the end of the stroke in the opposite direction the spring 184 of course serves the same function.

4. The signalling and counting mechanism

When the manipulating device is being utilized, for example, by children, it is desirable to employ a signal lamp one of which flashes on momentarily at the end of the forward stroke and the other at the end of the return stroke of the arm assembly G, the lamps being energized by means of dry cell batteries 190 mounted in the pocket 191 which is formed in casting 10. The electrical circuit (not shown) leading to the incandescent lamps 192 and 192a (see Fig. 1) are controlled by the two-way switching mechanism indicated generally by the numeral 193 and shown in detail in Fig. 6, the switch serving to momentarily close the circuit to one of the lamps at the end of the forward stroke and closing the circuit to the other lamp at the end of the return stroke of arm assembly G. The arm 177 has a notch 194 cut in the underside thereof and a "two-way" leaf terminal has the terminal portions 196 and 197 at opposite ends thereof, the terminal 196 being engageable with the terminal 198 at one end of the stroke and the terminal 197 being engageable with the terminal 199 at the opposite end of the stroke. Each of the terminals 198 and 199 have appropriate conductor wires 200 and 201, each of which are connected respectively to the terminals of lamps 192 and 192a. When the arm assembly G reaches either end of its stroke and one of the block assemblies 175 engages the arm 173 so as to rock the arm assembly 176, the electrical circuit will be closed through the terminals 196—198 at one end of the stroke and 197—199 at the opposite end of the stroke thereby momentarily lighting the lamps to indicate that the full stroke of the arm assembly G at each end thereof has been made. A block 204 is appropriately fixed to the under side of the cover 205 to insulate the terminals 198 and 199 from the cover and to position the terminals in the path of movement of the terminals 196 and 197 as the arm assembly 176 is rocked about the axis of pin 178. In Fig. 4 the cover 205 is shown removed, such cover being provided to close off the recess area 180 in the casting 10. The cover 205 has an elongated slot 206 to permit the arm 173 to be swung down to the dotted position as shown at 174 in Fig. 3.

A suitable counting mechanism indicated generally by the numeral 210 and shown in Figs. 1 and 2 can be mounted at the upper end of the casting 10 and it can be actuated by having an arm (not shown) which contacts with an appropriate abutment (not shown) projecting outwardly from the casting 160 so that each time the abutment engages the arm of the counting mechanism, the counting mechanism will be advanced one digit, that is, one digit on the forward stroke and one digit on the return stroke of the arm assembly G.

THE COMBINED ACTIVE AND PASSIVE MANIPULATOR OF FIGS. 16 THROUGH 24

In the type of manipulator shown in Figs. 1 through 15 the patient is capable of supplying the necessary physical energy for swinging the arm assembly G throughout the pre-selected range of movement, however, there may be instances in which the patient will be incapable of supplying the necessary physical energy for manipulating the swinging arm and in such cases it may be desirable to provide a power unit for actuating the manipulating arm assembly while the patient is simply "hanging on." This power driven type of manipulator may be referred to as the "passive" type wherein the patient's task is limited to grasping the arm assembly and hanging on while same is power actuated throughout its pre-selected range of movement.

However, it may be desirable to provide a combination manipulating device with selective adjustment means for utilizing the device in one instance as an "active" manipulating device and then subsequently re-adjusting same so that it may be utilized as a "passive" manipulating device.

1. The power drive mechanism

Referring to Fig. 16 I have shown a modified form of the invention in which the storage cabinet A' may be of sufficient size to accommodate the power actuating mechanism which is shown in plan view in Fig. 18. The power actuating mechanism drives the vertically extending shaft 17b which in turn drives the main shaft 17a of the head assembly E'. The power actuating mechanism may include an electric motor 220 which drives the pulley 221 which in turn drives pulley 222 by means of the V-belt 223, the R. P. M. of shaft 224 being determined by the setting of the speed reduction unit which is indicated generally by the numeral 225 and which may be generally of conventional construction. Briefly a T-beam 226 is pivoted at 227 and the rounded surfaces 228 and 229 engage the bearing blocks 230 and 231, block 230 being mounted in the end of the hub portion of pulley cheek 232 and block 231 being telescopically positioned on the hub portion of pulley cheek 233. Spring 234 normally urges pulley cheek 235 inwardly toward cheek 233, tending to continually increase the effective diameter of pulley 221. The speed reduction imparted to shaft 224 is effected by the adjustment unit 236 by which the arm 237 can be swung about the axis of pivot 227 to either increase or decrease the effective diameter of pulley 222, spring 234 automatically effecting the respective adjustment of the effective diameter of pulley 221. By means of the unit 225 I am able to obtain about a three to one speed reduction for the shaft 224. A suitable casting 238 may be secured at the floor of the cabinet A' and has an internal chamber for accommodating the worm wheel 239 which is constantly in mesh with worm 240 which is secured to the end of shaft 224. A boss 241 formed on the casting has a bore therein in which the bearing retainer sleeve 242 is received and secured to the outer end of the boss by means of bolts 243. The reduced portion 244 of the shaft is rotatably received in suitable sleeve bearings. The casting 238 has a boss 245 with a bore therein for receiving the tubular column C' and the remaining columns B' and D' are received in suitable bores in the base 246.

As in the device of Figs. 1 through 15 wherein the arm assembly G may be swung throughout any pre-determined length of arc or may be swung throughout full 360 degree repetitive revolutions, likewise, the combination device of Figs. 16 through 24, when the power unit is or is not being employed, can be adjusted so that the arm assembly G' can be swung throughout any pre-determined length of arc or it can be adjusted to permit repetitive 360 degree revolutions.

Referring to Fig. 17 a dog clutch member 247 is keyed to shaft 17b by means of key 248 so as to be rotatable along with said shaft but axially movable thereon to permit the clutch dogs 249 or 250 to be selectively moved into the appropriate openings 251 or 252 respectively for effecting either limited arcuate movement of arm assembly G' or continuous circular motion of same as will be explained hereinafter.

A suitable yoke member 253 is mounted on a pivot pin 254 and is connected to the operating handle 255 (see Fig. 16) which is located exteriorly of the cabinet A'. In Fig. 17 the clutch is shown in neutral position, such position being located at 256 on the cabinet A' and while in neutral position the shaft 17b will remain idle even though the power unit 220 may be operating.

The shaft 17b, of course, extends upwardly from the cabinet A' parallel to and within the confines of the columns B', C' and D' and the upper end may be rotatably journalled in the casting 257 (see Fig. 16), the shaft extending through appropriate openings in spaced bosses 258 formed on the underside of the cover member 259 (see Fig. 21) within the head assembly E'. A helical gear 260 is keyed to shaft 17b by means of key 261, however, the gear as well as the entire head assembly E' is capable of axial movement throughout substantially the entire length of shaft 17b so as to permit adjustment of said head assembly throughout the height of columns B', C' and D'. A helical gear 262 is continuously in mesh with gear 260 and is secured to the hub portion 263 of drive plate 264 for ultimately driving shaft 17a and the attached arm assembly G' as will be explained hereinafter.

When the motor 220 is operating, the worm wheel 239 is being continuously driven thereby. Viewing Fig. 17 the worm wheel 239 is fixed to the clutch sleeve 265 as by pins 266. The casting 238 has a web portion 267 with an apertured boss 268 having a sleeve bearing 269 therein in which the clutch sleeve 265 is rotatably journalled. A cover 270 closes off the open end of the annular chamber 271 formed in casting 238 and an annular seal 272 retains the lubricant within chamber 271 for the gears 239 and 240. When one desires to operate the arm assembly G' throughout a full 360 degrees continuous circular movement, the clutch dogs 250 are shifted into the openings 252 in the clutch sleeve 265 whereupon continuous circular movement is imparted by the clutch sleeve to clutch member 247 through key 248 to shaft 17b and thence through gears 260 and 262 and ultimately to shaft 17a.

When one desires to impart limited arcuate movement to arm assembly G' throughout a pre-determined arc and then to effect reverse movement of said arm assembly throughout such pre-determined arc, then this is accomplished by shifting the clutch dogs 249 into the openings 251 in clutch collar 273 which through appropriate booster gearing and linkage assemblies eventually imparts the appropriate oscillatory movement to shaft 17b as will be explained immediately following.

Referring to Figs. 17, 19 and 20 the clutch sleeve 265 has a crank 274 fixed thereto so that when the motor 220 is operating, the crank 274 is being continuously rotated in one direction about the axis of shaft 17b. The crank end of which is pivotally connected to link 276 by means of pin 277 and the continuous rotation of crank 274 reciprocates link 275 which in turn oscillates arm 276 back and forth throughout a pre-determined arc which is generated from the axis of stud 278. Link 276 is pinned to the stud 278 as by means of the pin 279 so that the stud oscillates along with link 276. Referring to Fig. 20 the linkage shown therein is located at a level above that of the linkage of Fig. 19 and the operation is as follows. Link 280 is fixed to stud 278 by means of pin 281 and oscillation of stud 278 is of course transmitted to link 280. This stud is rotatably journalled in a suitable boss 282 formed in the casting 238. Link 283 has a suitable block bearing 284 fixed on pin 285 and the bearing is received within the elongated slot 286 in link 280 the positioning of the bearing within the elongated slot determining the ultimate extent of the arc throughout which the arm assembly G' will be swung. The positioning of the block bearing within the elongated slot is effected exteriorly of the cabinet A' as by means of a control handle 288 operated throughout the range of stations as indicated in Fig. 16 and having appropriate operating mechanism (not shown) interconnected between said control handle and the link 283. The oscillation of arm 280 causes reciprocation of link 283 which in turn oscillates crank 289, one end of which is pivotally connected at 290 to the end of link 283 and the other end of which is loosely journalled on sleeve 291 which in turn is loose on shaft 17b.

The range of oscillatory movement of crank 276 is limited to a maximum of about 40 degrees and in order to be able to swing the arm assembly G' by means of the power unit 220 throughout an arcuate range of 100 degrees or more, it is necessary to increase by approximately 2¼ times the range of oscillatory movement of crank 276 and this is accomplished by means of suitable gearing indicated generally by the numeral 293 as viewed in Fig. 17. Crank 289 is fixed to spur gear 294 as by means of pin 292, the spur gear being in continuous mesh with spur gear 295 which is fixed to sleeve 296 by means of pins 297, sleeve 296 being loose on bearing sleeve 298 which is journalled on the reduced portion 299 of countershaft 300 which in turn is fixed in a suitable bore in the upper end of the boss 301 formed in casting 238. Spur gear 302 is also fixed to sleeve 296 by means of the pin 297 and is in continuous mesh with spur gear 303 which is fixed to the female clutch member 273 so as to be rotatable therewith, such clutch member being loose on sleeve 304 and thereby transmitting drive to shaft 17b only when the clutch dogs 249 are moved into the openings 251 of clutch member 273.

Thus when utilizing the machine as a "passive" manipulator, the stops 170 do not serve any function and arm 173 is swung out of the way into the dotted line position of Fig. 3.

The setting of handle 288 which determines the positioning of the arm 283 relative to the slot 286 in arm 280 thus accomplishes the purpose of setting the range of the arcuate movement which is transmitted to the arm assembly G' by means of the power unit 220 and the power unit 220 will effect the swinging of the arm assembly G' throughout the extent of such arc and will also effect the return travel of the arm assembly G' on the return stroke of such pre-determined arc.

When the arm assembly G' reaches the ends of the forward and reverse strokes sufficient cushioning is obtained due to the "slack" afforded in the linkage and booster gearing.

Thus the operation of the device when being utilized to actuate the arm assembly G' throughout a forward stroke and then a reverse stroke is as follows. Power actuated drive is from motor 220 to pulley 221, belt 223, pulley 222, shaft 224, worm 240, gear 239, clutch sleeve 65, crank 274, link 275, arm 276, stud 278, arm 280, link 283, crank 289, gear 294, gear 295, gear 302, gear 303, clutch sleeve 273, clutch 247, shaft 17b, gear 260, gear 262, drive plate 264, drive ring 73a, clutch plates 58b and 70b, bolts 59 and 60, casting 19 and arm assembly G' which is secured to casting 19. When it is desired to operate the arm assembly G' in a continuous manner in one direction of rotation and throughout successive 360 degree revolutions, then the arm 173 is swung down out of the way of the stops 170 and the drive is as follows. The drive from the power unit to gear 239 is the same as that for effecting oscillatory movement of arm assembly G'. The drive is then from gear 239 to clutch sleeve 265, clutch 247 (clutch dogs 250 being received in openings 252 in clutch sleeve 265), shaft 17b, gear 260, gear 262, drive plate 264, drive ring 73a, clutch plates 58b and 70b, bolts 59 and 60, casting 19 and then to arm assembly G'. The clutch sleeve 265 will cause rotation of crank 274 and consequently the actuation of the various links and the gear unit 293, however, the operation of these parts is merely an idling operation when clutch 247 is engaged with clutch member 265, the shaft 17b being rotated continuously in one direction of rotation.

When the machine is used as an "active" manipulator the stops 170 will function in the same manner as has been described herein with reference to the machine of Figs. 1 through 15, the device for cushioning the ends of the stroke of arm G as shown in Fig. 4 being available when arm 173 is raised to the position shown in Figs. 3 and 4.

2. *The head assembly of Figs. 21, 22, 23 and 24*

The head assembly of Figs. 21, 22, 23 and 24 is identical to the head assembly of the manipulating device of Figs. 1 through 15 except that portion of the head assembly which is shown most fully in Fig. 21, wherein the construction details of the differing parts of the head assembly are shown.

The clutch plate 58b and the clutch plate 70b are identical to and function similarly to the clutch plates 58 and 70 of Figs. 1 through 15 and the pressure plate 53a is identical in construction and function with the pressure plate 53 of Figs. 1 through 15. Referring to Fig. 21 the parts commencing with ring 62a and continuing outwardly to the end of casting 160a are identical to such parts as are shown in Figs. 1 through 15. The parts commencing with clutch plate 70b and continuing outwardly relative to stationary casting 10a toward and including the rotatable casting 19 are identical with the parts shown in the head assembly of Figs. 1 through 15. Referring to Fig. 21 the stationary casting 10a is elongated in its central region to provide the general annular chamber 310 to accommodate the vertical drive shaft 17b and the gears 260 and 262. The drive plate 264 to the hub portion of which gear 262 is fixed, is loose on shaft 17a, the hub 263 having a sufficiently large axial bore therethrough to accommodate the sleeve bearings 311 and 312. A collar 313 is pinned to shaft 17a to retain the hub portion of drive plate 264 between the thrust bearings 314 and 315 so that gear 262 is always maintained in proper mesh with gear 260.

When utilizing the mainipulating device as a "passive" manipulator with the power unit 220 actuating the arm assembly G', the annular ring 130a will be employed as a driving ring to transmit rotation from the drive plate 264 to the shaft 17a and when utilizing the manipulating device as an "active" manipulator, the ring 130a will be held stationary so as to function in the same manner as ring 73 of the manipulating device of Figs. 1 through 15. Thus ring 130a is loosely journalled within the internal wall of stationary casting 10a being retained from movement axially of shaft 17a by the clutch facings 71a and 72a which are fixed to the clutch rings. Drive plate 264 has an elongated arcuate slot 316 into which the pin 317 which is fixed to ring 130a permanently projects thereby providing a lost motion connection between the drive plate and ring 130a for reasons to be explained hereinafter.

A pressure plate in the form of an annular ring 318 has a pair of diametrically opposed drive pins 319, see Fig. 22, fixed thereto and permanently projecting into the openings 320 in the drive plate 264 which openings are normally in registry with complementary openings 321 in ring 130a (the openings in the plate and ring would be out of registry only during the torque calibrating operation as will be explained hereinafter). A pair of cams 322 and 323 are fixed to an actuating shaft 324 which is journalled for rotation at its opposite ends in the opposite walls of casting 10a. A crank 325 is fixed to the end of the actuating shaft and is located exteriorly of the casting 10a for rotating said shaft to cause the cams to act against the pressure plate 318 whereby the pins 319 will move into the ring openings 321 as the pressure plate 318 is moved toward drive plate 264, thereby establishing a positive drive between drive plate 264 and ring 130a. In Fig. 21 the cams are shown rotated so as to establish the driving condition and in Fig. 22 the pressure plate 318 is shown in its normal retracted position wherein the pins 319 are withdrawn out of the ring openings 321. The compression springs 326 normally urge the pressure plate 318 into the retracted position as shown in Fig. 22 whenever the cams are released. Shaft 324 has a lateral loop at 327 formed therein to permit the required limited rotation of shaft 324 without interference with the hub 263.

With the device being utilized as a "passive" manipulator, the motor 220 in operation and clutch 247 engaged with either clutch member 273 or 265, the drive plate 264 will be in driving engagement with ring 130a as shown in Fig. 21 so that ring 130a will drive the shaft 17a as the result of the annular flange 73a of said ring having frictional contact with the facings of the clutch rings 58b and 70b, such clutch rings having the lost motion connection to rods 59 and 60 as best viewed in Fig. 4, by virtue of the arcuate slots 58a and 70a thus transmitting rotation from ring 130a to the casting 19 to which the arm assembly G' is connected. During use of the device as a "passive" manipulator the setting of the actuator bars 96 and 97 will be in the neutral position as best viewed in Fig. 13 in which position the rollers 81 and 82 will remain at the apexes 78 and 79 of the cam surfaces on the cam ring 75 so that the pressurized contact of the clutch facings with the annular flange 73a will remain constant.

Thus a pre-determined amount of pressurized contact of the clutch facings with the annular flange of the drive ring will be initially effected by adjustment of the nut 66 and the amount of such pressurized contact will remain constant during the use of the device as a "passive" manipulator and the amount of such pressurized contact will be sufficient to assure that a driving contact to arm assembly G' will be maintained while the patient is hanging onto same. However, if an emergency should arise wherein the patient exerts too much resistance on the arm assembly G' (such as may be occasioned by the patient getting some part of his body tangled between the arm assembly and the cabinet A' or otherwise entangled in the machine) then slippage can occur between the clutch facings and ring 130a to prevent undue injury to the patient pending shutting off the motor 220.

When the machine is to be utilized as an "active" manipulator, it will normally be desirable to adjust the head assembly for operation under a pre-determined desired torque setting, that is, if it should be desired to have a pre-determined amount of torque resistance on arm assembly G' throughout the forward stroke and a lesser resistance on the return stroke or vice-versa as has been fully explained with reference to the operation of the machine of Figs. 1 through 15, then the setting of the torque requirements is as follows.

Handle 325 is rotated to release the cam causing pressure plate 318 to be retracted to the position as shown in Fig. 22. Now the only connection between drive plate 264 and ring 130a is through the lost motion connection established by slot 316 and pin 317 thereby permitting limited movement of ring 130a within the limits of the slot 316. With the power unit 220 out of operation, drive plate 264 becomes a stationary member. Right and left hand torsion springs 330 and 331 have their coils telescopically positioned on the hub portion 332 of drive plate 264 and each of said springs has one of its ends fixed to ring 130a and the other of its ends fixed to the drive plate 264 (as best shown in Fig. 23) and rotation of drive plate 264 relative to ring 130a in one direction will be progressively resisted by one of the torsion springs and rotation of said drive plate relative to ring 130a in the opposite direction will be progressively resisted by the remaining torsion spring in the same manner as is accomplished by means of the compression springs 136 and 137 of the machine of Figs. 1 through 15. Then the actuator bars 96 and 97 are adjusted by rotation of nut 86 as has previously been explained with reference to the machine of Figs. 1 through 15 in order to effect the desired operation of the rollers 81 and 82 relative to the cams 76 and 77 on cam ring 75. Then arm assembly G' can be manually swung throughout its forward stroke and then the return stroke while watching the indicator pointer 133a to obtain the desired torque readings on both the forward and return stroke of said arm assembly. Thus the torque calibrating operation is effected in the same manner on both machines except that the pointer 133a is fastened to the housing 10a and the indicia which make up the scale comparable to the scale as shown in Fig. 15 would be inscribed in the external circumferential wall of ring 130a so as to be visible through the slot 134a. After completing the setting of the desired torque condition for both the forward and return stroke of arm assembly G', then handle 325 will be again rotated to establish the driving engagement between drive plate 264 and ring 130a. The drive plate 264 now functions as the stationary element for holding the ring 130a stationary while the machine is being utilized as an "active" manipulator in the same manner that pin 152 holds ring 130 stationary during use of the active manipulator of Figs. 1 through 15. It will be understood that clutch 247 will be engaged with either clutch sleeve 265 or 273 so that the shaft 17b will be held stationary by means of the various driving connections leading to the armature of the now idle motor 220. Thus it is apparent that the machine of Figs. 16 through 24 may be utilized either as a "passive" manipulator wherein the power unit 220 is employed or it may be utilized as an "active" manipulator wherein the power unit 220 is turned off and the clutch 247 is shifted into engagement with clutch sleeve 265 or 273. Referring to Fig. 16 I have provided a switch 340 which has appropriate conductor wires leading to the windings of the motor 220 whereby the direction of rotation of the motor shaft 341 can be pre-selected, the motor being of the reversible type.

While I have shown in Figs. 1 and 2 a common form of accessory for attachment to the arm assembly G, such accessory consisting of the hand gripping type of handle 30 which is rotatably mounted on a pin that projects outwardly at right angles relative to the arm rods 24 and 25, it will be understood that a large variety of different types of accessories may be connected to the outer end of the arm assembly G for obtaining various different types of movements which originate from the two available movements of the basic machine, that is, the continuous rotary movement and the oscillatory movement, both of which are effected in a vertical plane.

For example, by means of different types of accessories which are removably attachable to the arm assembly G, I am able to obtain ultimate movements of different types in either a horizontal or a vertical plane for exercising different parts of the human body, some of which movements may be listed as follows:

1. For the neck-traction and rotation.
2. For the spine-traction and rotation
3. For the elbow-rotation in a horizontal plane or rotation in a vertical plane; traction; flexure in a vertical plane
4. For the wrist-rotation in either one or two planes at the same time and traction
5. For the shoulder-rotation in a horizontal plane or in a vertical plane; traction; flexure in a vertical plane
6. For the ankle rotation in either one or two planes at the same time
7. For the knee-flexure in a vertical plane
8. For the hip-flexure in a vertical plane; rotation in a horizontal plane
9. For the arm-complete flexure, that is, continuous rotation in either a vertical or a horizontal plane and in either direction
10. For the leg-complete rotation in a horizontal plane.

I claim:

1. A manipulating device comprising: a carriage; spaced parallel vertical columns supported on the carriage; a non-rotatable housing having portions telescopically positioned on said columns, whereby the housing may be adjusted lengthwise of said columns to any pre-selected position of vertical height relative thereto; means on the housing for simultaneously coacting with each column to temporarily anchor said housing in a pre-selected position of vertical adjustment relative to said columns; a rotor rotatably supported in the housing; an arm carried by the rotor and adjustable to various lengths as measured from the axis of the rotor and means supported in the stationary housing for imposing a resistance to the swinging of the arm and rotor relative to the housing, the means carried by the housing for simultaneous coaction with the columns to anchor the housing in a pre-selected position of vertical height on the column includes a bar carried by the housing for rocking movement, said housing having bores therein; a pin in each bore, each pin being engageable at one end with one of the columns and at its other end with the bar and an adjustment screw engageable with the bar for rocking same to simultaneously force the pins into clamping engagement with their respective columns.

2. For use with a manipulating device having a supporting structure, a housing carried on the supporting structure and a rotor rotatably supported by the housing, mechanism for controlling the torque required to rotate the rotor comprising: a block forming part of the rotor and being rotatably journalled within the housing; a braking device rotatable along with the rotor; a reaction ring mounted within the housing with which the braking device coacts for imposing a pre-determined amount of resistance to the rotation of the rotor; means coacting with the reaction ring and the housing for selectively preventing rotation of the ring relative to the housing and adjustment means having engagement with the brake device and with the block for imposing a predetermined load upon the braking device, said adjustment means including a pressure plate engageable with the braking device and rods having connection to the plate and also having adjustable connection with the block.

3. The device as set forth in claim 2 wherein secondary adjustment means are provided for varying the amount of torque required to rotate the rotor in one direction with reference to the amount of torque required to rotate the rotor in the opposite direction.

4. For use in an exercising machine having a supporting structure, a housing carried on the supporting structure and a rotor rotatably supported by the housing, mechanism for controlling the torque required to rotate the rotor comprising: a block forming part of the rotor and being rotatably journalled within the housing; a shaft extending through the housing and being connected to the block; a reaction ring encircling the shaft and mounted within the housing; means for selectively anchoring the reaction ring stationary relative to the rotor; a braking device including first and second braking rings encircling the shaft and coacting with the reaction ring on opposite sides thereof; a pressure plate having engagement with the first braking ring for urging same into engagement with the reaction ring; a roller carrier journalled on the shaft and including a roller engageable with the second braking ring for urging same into engagement with the opposite side of the reaction ring; a cam ring encircling the shaft and having cam surfaces engageable with the roller and adjustable means coacting with the pressure plate and the block for imposing a pre-determined pressure on one of the braking rings, such pressure being opposed by the coaction of the roller with the other braking ring.

5. A device as set forth in claim 4 wherein secondary adjustment means are provided for varying the amount of torque required to rotate the rotor in one direction with reference to the amount of torque required to rotate the rotor in the opposite direction, said secondary adjustment means including a two way cam surface on the cam ring; levers on opposite sides of the roller, said levers being journalled on the shaft; means for positioning said levers relative to the roller to limit the travel of the roller on the cam surfaces thereby varying the pressure being exerted on the second braking ring by the roller during rotation of the rotor.

6. The device as set forth in claim 5 wherein means are provided for selectively retracting one of the levers to permit increased travel of the roller down the cam surface associated with such lever, said means including actuator bars movably supported on the block and engageable with the levers for determining the positioning of the levers relative to the roller; a second block mounted on the first block for limited rotation relative thereto; pins secured to the second block and coacting one each with one of the actuator bars and means for rotating the second block relative to the first block for retracting one of the actuator bars.

7. For use with a manipulating device having a supporting structure, a housing carried on the supporting structure and a rotor rotatably supported by the housing, mechanism for controlling the torque required to rotate the rotor comprising: a block forming part of the rotor and being rotatably journalled within the housing; a braking device rotatable along with the rotor; a reaction ring mounted within the housing with which the braking device coacts for imposing a pre-determined amount of resistance to the rotation of the rotor; means coacting with the reaction ring and the housing for selectively preventing rotation of the ring relative to the housing and adjustment means having engagement with the brake device and with the block for imposing a pre-determined load upon the braking device, means for recording the amount of torque which is required to rotate the rotor, said means including: a resilient member having connection with the housing and engageable with the reaction ring for resisting rotation of the reaction ring relative to the housing with a progressively increasing amount of resistance and an indicating device associated with the reaction ring for reflecting the amount of such resistance.

8. For use with a manipulating device having a supporting structure, a housing carried on the supporting structure, a rotor rotatably supported by the housing and adapted for contact with some part of the human body for exercising same, mechanism for controlling the rotative movement of the rotor comprising: a block forming part of the rotor and rotatably supported in the housing; a shaft extending through the housing and connected to the block so as to be rotated thereby; a second block connected to the shaft so as to be rotated thereby and means associated with the housing and the second block to determine the extent of the rotative movement of the rotor relative to the housing in both a forward and reverse direction of rotation, said means including stops adjustably carried by the second block and a stationary lever engageable by one of the stops when the rotor is rotated in one direction and engageable by the other stop when the rotor is rotated in the opposite direction.

9. A device as set forth in claim 8 wherein means are provided for cushioning the engagement of the stops with the lever, said means including a pivot pin for pivotally supporting the lever relative to the housing and a resilient member on each side of the lever for progressively resisting the pivotal movement of the lever when engaged by one of the stops.

10. A device as set forth in claim 9 wherein means are provided for recording the engagement of one of the stops with the lever, such means including an electrical switch terminal connected to the lever; additional terminals engageable by the switch terminal as a result of the pivotal movement of the lever when engaged by one of the stops; an electrically responsive indicator device and an electrical circuit connected between the additional terminals and the indicator device, such circuit being opened and closed in response to the engagement and disengagement of the switch terminal with one of the additional terminals.

11. An exercising machine comprising: a carriage; a column supported on the carriage; a housing adjustably carried on the column for adjustment to any pre-selected height relative to the column; a rotor supported for rotation relative to the housing; a power unit mounted on the carriage; a drive shaft independent of the column but parallel thereto; drive means for establishing driving connection between the power unit and the drive shaft, whereby to rotate the drive shaft continuously in one direction of rotation; additional drive means for establishing a separate driving connection between the power unit and the drive shaft, whereby to oscillate the drive shaft throughout an arc of less than 360 degrees; a clutch for selectively establishing driving connection between the drive shaft and one of the drive means and a driving connection for establishing driving engagement between the drive shaft and the rotor.

12. An exercising machine comprising: a carriage; a column supported on the carriage; a housing adjustably carried on the column for adjustment to any pre-selected height relative to the column; a rotor supported for rotation relative to the housing; a power unit mounted on the carriage; a drive shaft supported on the carriage for rotation relative thereto; a drive connection for establishing driving engagement between the drive shaft and the rotor; drive means for establishing driving connection between the power unit and the drive shaft, whereby to rotate the drive shaft continuously in one direction of rotation; additional drive means for establishing a separate driving connection between the power unit and the drive shaft, whereby to oscillate the drive shaft throughout an arc of less than 360 degrees; said additional drive means including a crank connected to the first drive means; linkage connected to the crank and actuated thereby for converting the continuous rotative movement of the crank into oscillatory movement of the linkage; means included within the linkage for selectively pre-selecting the range of oscillatory movement to be imparted to the drive shaft, said last means including one lever of the linkage having an elongated slot therein and another link of said linkage having one of its ends connected within said slot and being selectively movable to a pre-determined position within the limits of said slot; and a clutch for selectively establishing driving connection between the drive shaft and one of the drive means.

13. An exercising machine comprising: a carriage; a column supported on the carriage; a housing adjustably carried on the column for adjustment to any pre-selected height relative to the column; a rotor supported for rotation relative to the housing; a power unit mounted on the carriage; a drive shaft supported on the carriage for rotation relative thereto; a drive connection for establishing driving engagement between the drive shaft and the rotor; drive means for establishing driving connection between the power unit and the drive shaft, whereby to rotate the drive shaft continuously in one direction of rotation; additional drive means for establishing a separate driving connection between the power unit and the drive shaft, whereby to oscillate the drive shaft throughout an arc of less than 360 degrees; said additional drive means including a crank connected to the first drive means; linkage connected to the crank and actuated thereby for converting the continuous rotative movement of the crank into oscillatory movement of the linkage; means for selectively pre-selecting the range of oscillatory movement to be imparted to the drive shaft; a clutch for selectively establishing driving connection between the drive shaft and one of the drive means and a train of gears actuated by the linkage for multiplying the extent of the oscillatory movement obtained by the linkage and transmitting such multiplied oscillatory movement to the drive shaft.

14. A device as set forth in claim 13 wherein a variable speed mechanism is interposed between the power unit and the first drive means, said mechanism being selectively adjustable to a predetermined position for obtaining a pre-selected speed to be imparted to the drive shaft.

15. A combined active or passive manipulating machine, wherein operation of the machine may be power driven or manual, said machine comprising: a carriage; a column supported on the carriage; a housing carried on the column; a rotor supported for rotation relative to the housing; a power unit mounted on the carriage; a drive shaft supported on the carriage for rotation relative thereto; a drive connection for establishing driving engagement between the drive shaft and the rotor; drive means for establishing driving connection between the power unit and the drive shaft, whereby to rotate the drive shaft continuously in one direction of rotation; additional drive means for establishing a separate driving connection between the power unit and the drive shaft, whereby to oscillate the drive shaft throughout an arc of less than 360 degrees; a first clutch for selectively establishing driving connection between the drive shaft and one of the drive means; a reaction ring normally loosely journalled within the housing; a second clutch for establishing driving connection between the reaction ring and the rotor; said drive connection which establishes driving engagement between the drive shaft and the rotor including a drive plate adjacent the reaction ring; a lost motion connection between the drive plate and the reaction ring; resilient means interconnected between the drive plate and the reaction ring for progressively resisting rotation of the reaction ring relative to the drive plate in order to effect a recording of the resistance to rotation of the second clutch relative to the reaction ring; additional connecting elements for making driving connection between the drive plate and the reaction ring upon movement of the drive plate toward the reaction ring; means for moving the drive plate toward the reaction ring for effecting driving connection between the drive plate and the reaction ring through the medium of the interconnecting elements, said reaction ring being held stationary relative to the housing by engaging the first clutch with either the first drive means or the additional drive means, the power unit being inactive, whereby the rotor is available for manual operation, said reaction ring serving to drive the second clutch for actuating the rotor when the power unit is activated.

References Cited in the file of this patent

UNITED STATES PATENTS

| | | |
|---|---|---|
| 2,530,921 | Tougas | Nov. 21, 1950 |
| 2,701,626 | Walther | Feb. 8, 1955 |